Sept. 12, 1961 F. ASHWORTH ET AL 2,999,766
MAGNETIC SIGNAL CARRIERS
Filed Feb. 3, 1958
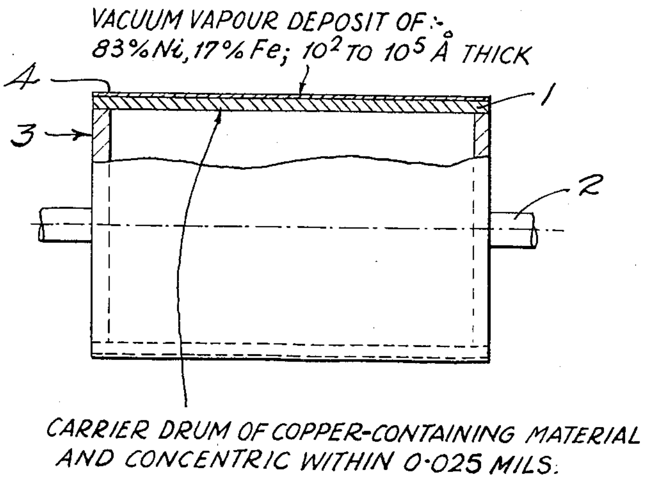
INVENTORS
FRED ASHWORTH
ALFRED JOHN KNOWLES
[signature]
ATTORNEY United States Patent Office 2,999,766
Patented Sept. 12, 1961

2,999,766
MAGNETIC SIGNAL CARRIERS

Fred Ashworth, Sale, and Alfred John Knowles, Flixton, Manchester, England, assignors to Metropolitan-Vickers Electrical Company Limited, London, England, a company of Great Britain

Filed Feb. 3, 1958, Ser. No. 712,644
Claims priority, application Great Britain Feb. 27, 1957
1 Claim. (Cl. 117—94)

This invention relates to magnetic signal carriers of the kind comprising a supporting member provided with a coating of magnetic material of minute thickness, especially memory drums as used for instance for electrical computers, and aims at providing an improved signal carrier of the kind referred to, and a method of producing it.

In particular the invention aims at providing such a carrier which responds rapidly to the signals from a recording head by forming well defined small areas of magnetic saturation, representing magnetic marks or "memory cells" on the magnetic film, storing pieces of information with negligible interference between neighbouring memory cells, so that these magnetic areas may be close to each other and the "packing density" of the memory cells may be high. Another aim of the invention is to ensure well defined magnetic marks yielding a signal output of adequate amplitude when the information is reproduced by a reading head. Yet another aim is to provide on the supporting member a layer of minute thickness which combines these magnetic properties with desirable mechanical properties, and adheres well to the supporting member to form a more durable, homogeneous, tenacious and blister-free film than has been known with conventional information carriers such as memory drums where the magnetic film was obtained by spraying an oxide, or by electrolytic deposition of metal or alloy.

It has been found that the abovementioned magnetic and mechanical requirements can be fulfilled with a magnetic memory or signal carrier comprising a film deposited upon its supporting member, such as a drum surface, by a vacuum vapour deposition process. Accordingly the present invention relates to such a memory or signal storing means and to a method of making the same.

Advantageously the magnetic film consists of a nickel iron alloy and in order to obtain best results the supporting member is made of a material which is not ferromagnetic.

A suitable method of preparing a signal carrier or memory means according to the invention will now be described by way of example.

The drawing illustrates the general arrangement of a drum member, partly broken away, which can be utilized in carrying out the present invention.

The supporting member may be formed of a copper cylinder 1, and if this cylinder has to be brazed a suitable bronze such as known under the registered trademark SIFA may be used therefor. Although other material is possible copper has been found preferable for this support because it can be readily polished to a degree comparable with the minute thickness of the film and withstands the high temperature required in the vacuum vapour deposition process. The drum shaft 2 may be of steel. When the drum 3 is supported on bearings by means of the shaft 2 its surface is precision ground, preferably to such a degree that the eccentricity of the drum surface is less than 0.025 mil, thereby to prevent in the following recording and reproduction processes inaccuracies due to fluctuations in the magnetic intensity, as the magnetising effect varies inversely as the square of the distance between the signal carrier and the magnetic head.

The drum 3 is then placed in an apparatus of the kind known for producing films by vacuum vapour deposition and is highly polished, using for instance jeweller's rouge on pieces of cotton wool, which is damped with ether, while avoiding any handling which may contaminate the drum surface. The final finish of the drum cylinder surface is achieved by dry polishing until the surface roughness is not substantially more than $10^5$ A. The final finish may be done for example with cotton wool until the dry material is no longer discoloured by the polishing, which indicates that the drum surface is free of oxide and ready to be coated.

It has been found that a carrier according to the invention can be made from an alloy consisting of 83 parts of pure nickel, and 17 parts of pure iron, but the invention is not so limited, and other alloys or materials may be used with success. In the present example the nickel and iron are mixed in powder form, and are melted, preferably in a crucible of alumina covered with a ceramic lid so as to prevent the powder from blowing out when heated.

In order to attain a high degree of purity an electric vacuum furnace, preferably of a high frequency type is used with a vacuum not less than $10^{-4}$ mm. Hg. Thus a solid ingot of the pure alloy is formed from the powder mixture.

The so obtained solid alloy is placed into a crucible in a high-frequency induction heater coil situated below the drum to be coated. Then the apparatus is evacuated, first to 0.001 mm. Hg for instance using a rotary pump before the electric motor for rotating the drum and the heaters are switched on when the pressure rises. After it is reduced again, say to a value of 0.001 mm. Hg, the high vacuum is produced, using a diffusion pump backed by the rotary pump. When the vacuum is $10^{-5}$ mm. Hg or better and the drum is heated, e.g. by radiant heat to a temperature of say 350° C., so as to remove adsorbed water, degass the surface and increase the atom mobility at the surface, the nickel iron alloy is vaporised, for example, by electric high frequency induction heating, and travels from the crucible to the drum surface on which it is deposited.

The vacuum vaporisation process is controlled, as is known in the art, by the power supplied for heating the melt, the positional relationship between the melt and the surface on which the deposit 4 has to be formed and also, if desired, by an electric field or plasma between the two. When a suitable film thickness, preferably between $10^2$ and $10^5$ A. is formed the process is interrupted.

If the deposition process takes place in a directional magnetic field the storage properties of the resultant film may be enhanced.

It will be understood that details can be varied without departing from the invention. Thus the shape of the supporting member and the material of which it is made may be chosen to suit the actual conditions and also a particular magnetic film whose composition may also be different from the ferro-magnetic alloy mentioned above.

What we claim is:

A signal storing device comprising a surface layer on a non-magnetic carrier body, said surface layer being formed by vacuum vapor deposition of an alloy containing 83 parts of pure nickel and 17 parts of pure iron and having a thickness between $10^2$ and $10^5$ A. providing a coercivity between 200 and 600 oersteds, and said carrier body comprising a rotatable cylinder of a material including copper, the outer surface of the cylinder being concentric with the axis of rotation within 0.025 mil and having a surface roughness not substantially more than $10^5$ A.

(References on following page)

References Cited in the file of this patent

UNITED STATES PATENTS

| | | |
|---|---|---|
| 836,339 | Pedersen | Nov. 20, 1906 |
| 1,982,774 | Winkler et al. | Dec. 4, 1934 |
| 2,185,300 | Hickman | Jan. 2, 1940 |
| 2,443,756 | Williams et al. | June 22, 1948 |
| 2,671,034 | Steinfeld | Mar. 2, 1954 |
| 2,794,180 | Berger et al. | May 28, 1957 |
| 2,900,282 | Rubens | Aug. 18, 1959 |

FOREIGN PATENTS

| | | |
|---|---|---|
| 670,993 | Great Britain | Apr. 30, 1952 |